(12) United States Patent
Niihara et al.

(10) Patent No.: US 8,650,754 B2
(45) Date of Patent: Feb. 18, 2014

(54) METHOD FOR MANUFACTURING IMPELLER

(75) Inventors: Koshiro Niihara, Tokyo (JP); Hiroki Takagi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/379,710

(22) PCT Filed: Jan. 28, 2011

(86) PCT No.: PCT/JP2011/000484
§ 371 (c)(1),
(2), (4) Date: Jan. 26, 2012

(87) PCT Pub. No.: WO2012/063375
PCT Pub. Date: May 18, 2012

(65) Prior Publication Data
US 2012/0117803 A1     May 17, 2012

(30) Foreign Application Priority Data

Nov. 11, 2010   (JP) ................................. 2010-252434

(51) Int. Cl.
*B21D 53/78* (2006.01)
*B21K 25/00* (2006.01)
*B23P 15/04* (2006.01)
*B23Q 7/00* (2006.01)
*B22D 11/128* (2006.01)

(52) U.S. Cl.
USPC ....... 29/889.21; 29/527.1; 29/559; 29/DIG. 4

(58) Field of Classification Search
USPC .............. 29/889, 889.21, 559, 527.1, DIG. 4
See application file for complete search history.

(56) References Cited

U.S. PATENT DOCUMENTS

| 2,310,841 | A | * | 2/1943 | Curtis | .............................. 269/41 |
| 2,402,204 | A | * | 6/1946 | Phelan et al. | .............. 219/85.17 |
| 2,654,943 | A | * | 10/1953 | Campbell | .................... 29/889.4 |
| 4,134,567 | A | * | 1/1979 | Kurscheid | ....................... 249/83 |

(Continued)

FOREIGN PATENT DOCUMENTS

| JP | 07-109997 | 4/1995 |
| JP | 07-224789 | 8/1995 |

(Continued)

OTHER PUBLICATIONS

Translation of the International Preliminary Report on Patentability issued May 14, 2013 in International Application No. PCT/JP2011/000484.
Japanese Office Action, with English translation, issued Nov. 27, 2013 in Japanese Patent Application No. 2010-252434.

*Primary Examiner* — David Bryant
*Assistant Examiner* — Jun Yoo
(74) *Attorney, Agent, or Firm* — Wenderoth, Lind & Ponack, LLP (57) ABSTRACT

A method for manufacturing an impeller includes providing a disc and a cover separate from the disc, one of the cover and the disc having integrally formed blades and the other one of cover and the disc having a first joint surface, joining the disc and the cover to each other by brazing in a state in which a first brazing filler metal is interposed between the first joint surface and a second joint surface provided on the blades, and during the joining operation, maintaining a space between the first joint surface and the second joint surface by providing a spacer on an outer periphery side of the impeller. The thickness of the spacer is smaller than the thickness of the first brazing filler metal before melting. The spacer is formed integrally with the blade or is formed integrally with said other one of the cover and the disc.

10 Claims, 6 Drawing Sheets

(56) References Cited

U.S. PATENT DOCUMENTS

| | | | |
|---|---|---|---|
| 4,626,478 A * | 12/1986 | van Dyk Soerewyn | 428/596 |
| 5,796,123 A * | 8/1998 | Salbreux | 257/110 |
| 5,797,181 A * | 8/1998 | Robinson | 29/888.024 |
| 8,061,031 B2 * | 11/2011 | Ranz et al. | 29/889.21 |

FOREIGN PATENT DOCUMENTS

| | | |
|---|---|---|
| JP | 2002-180993 | 6/2002 |
| JP | 2005-146962 | 6/2005 |
| JP | 2010-174652 | 8/2010 |
| WO | WO 9622854 A1 * | 8/1996 |

* cited by examiner

METHOD FOR MANUFACTURING IMPELLER

TECHNICAL FIELD

The present invention relates to a method for manufacturing an impeller that is used for a centrifugal rotating machine such as a centrifugal compressor.

BACKGROUND ART

Conventionally, as an impeller used for a centrifugal rotating machine such as a centrifugal compressor, there has been known a covered impeller (closed impeller) including a disc attached to a rotating shaft, a cover installed with a space being provided with respect to the disc, and a plurality of blades for connecting the cover to the disc. For this impeller, a portion surrounded by the side surfaces of blades, the cover, and the disc constitutes a passage for compressing air.

As a method for manufacturing this impeller, there has been known a method in which the disc and the cover, which are produced separately, are joined to each other. In this method, the blades are often formed integrally with either of the disc and the cover. As a method for joining the disc and the cover to each other, welding or brazing is selected. In the joining by welding, a welding torch must be inserted into the passage, and it has been pointed out that if the passage is narrow, it is difficult to insert the welding torch into the passage, and therefore welding defects are liable to occur. In contrast, in the joining by brazing, for example, when the cover with blade is joined to the disc, a brazing filler metal is placed on the joint surface, and the cover and the disc are inserted into a heating furnace in a lapped state to join them, so that even if the passage is narrow, the joining work can be performed easily.

Patent Document 1 proposes a method for joining the disc to the cover by brazing. In this method, the cover is placed so that the blade mounting surface faces up, and brazing is performed in the state in which the blade and disc are placed on the cover. According to the method proposed by Patent Document 1, insufficient supply of brazing filler metal to a portion that is a joint portion of the blade to the cover and the disc, on the inner periphery side in the radial direction of impeller, on which portion the rotational stresses at the impeller operation time concentrate, is prevented.

CITATION LIST

Patent Document

Patent Document 1: Japanese Patent Laid-Open No. 2010-174652

SUMMARY OF INVENTION

Technical Problem

In Patent Document 1, although insufficient supply of a blazing filler metal to the inner periphery side in the radial direction of impeller is prevented, a problem described below is presented concerning the method for manufacturing an impeller by brazing. When brazing is performed in the state in which the blade and disc are placed on the cover, the weights of the disc and further the blade are applied to the molten brazing filler metal. Therefore, the brazing filler metal melted during the brazing operation flows out of the joint surface, and the thickness of the brazing layer after the brazing filler metal has solidified (brazing operation has been finished) becomes smaller than the assumed thickness. Thereby, the toughness value of the joint portion (joint toughness value) is made insufficient. For example, when brazing is performed by placing a brazing filler metal having a thickness of 100 μm, the thickness of brazing layer becomes 50 μm. Even if a thick brazing filler metal is used, the amount of brazing filler metal flowing out of the joint surface simply increases, and the brazing filler metal is consumed wastefully.

The present invention has been devised to solve the above problem, and accordingly an object thereof is to provide a method for manufacturing an impeller, in which a brazing layer having a necessary thickness can be secured easily while the waste of a brazing filler metal is eliminated.

Solution to Problem

To achieve the above object, the present invention provides a novel method for manufacturing an impeller.

An impeller relating to the present invention includes a disc, a cover arranged facing to the disc, and a plurality of blades provided between the disc and the cover. This impeller is formed with a passage between the disc and the cover.

The method of the present invention includes a step X of separately producing the disc and the cover. Either one of the disc and the cover is formed integrally with the blades.

As the next step, the method of the present invention includes a step Y of joining the disc and the cover to each other by brazing in the state in which a first brazing filler metal is interposed between a first joint surface provided on the blade and a second joint surface provided on either one of the disc and the cover.

The present invention is characterized in that in the step Y, brazing operation is performed by providing a spacer, which is used to maintain a space between the first joint surface and the second joint surface, on the outer periphery side of the impeller. The thickness of the spacer is preferably smaller than that of the brazing filler metal before melting.

In the present invention, as a mode for providing the spacer, either of the two modes described below can be selected.

A first mode is to produce the spacer separately from the disc and the cover. In this case, the spacer is placed between the first joint surface and the second joint surface.

A second mode is to form the spacer integrally with the blade or to form the spacer integrally with either one of the disc and the cover. For example, in the case where the blade is produced integrally with the disc, the spacer is formed integrally with the blade or integrally with the cover.

In the second mode, if the spacer is formed integrally when the disc or the cover is produced, the subsequent work for placing the spacer between the first joint surface and the second joint surface can be omitted. Therefore, the second mode has an advantage that the manufacturing process can be simplified as compared with the first mode.

In the present invention, after the brazing operation has been ended, a portion in a predetermined range on the outer periphery side of the impeller can be removed. The impeller is subjected to heat treatment including brazing, and distortion occurs on account of the heat treatment. This distortion increases toward the outer periphery side of impeller. Therefore, to secure the dimensional accuracy of impeller, too, it is preferable to remove, by cutting or the like, the portion in a predetermined range on the outer periphery side of the impeller.

The brazing operation is performed without providing the brazing filler metal between the spacer and the first or second joint surface. Therefore, the joint between the spacer and the first or second joint surface is insufficient. Accordingly, in the present invention, from the viewpoint of ensuring the strength of the impeller, it is preferable that after the brazing operation has been completed, the spacer be removed by cutting or the like by removing the portion in a predetermined range on the outer periphery side of the impeller.

In the present invention, before the brazing operation, the first brazing filler metal is interposed between the first joint surface and the second joint surface. It is preferable that the brazing filler metal be divided into plural numbers in the lengthwise direction to form brazing filler metal segments, and the brazing filler metal segments be interposed between the first joint surface and the second joint surface. Since the first joint surface (or the second joint surface) is sloped, it is not easy to gaplessly place the rigid integral first brazing filler metal along the first joint surface (or the second joint surface). For this reason, the first brazing filler metal is divided in the lengthwise direction. Since the divided individual brazing filler metal segment is short, it can easily be placed gaplessly along the first joint surface (or the second joint surface). In this case, a second brazing filler metal is preferably provided in a location corresponding to the joint of the adjacent brazing filler metal segments. The reason for this is that the brazing operation in the joint portion is performed more reliably. Also, it is preferable that the brazing operation be performed by providing a third brazing filler metal to form a fillet in the joint portion after brazing.

In the step Y of the present invention, the brazing operation can be performed in a state in which a pressure is applied in the axial direction to the disc and the cover by using a jig, whereby the degree of close adhesion of the brazing filler metal to the joint surface can be increased. It is preferable that this jig coaxially include a first restraint part which is in contact with the inside diameter of the cover to restrain the radial movement of the cover, and a second restraint part which is in contact with the inside diameter of the disc to restrain the radial movement of the disc. With such a jig, at the brazing time, the disc and the cover can be prevented from positionally shifting in the radial direction. Also, even if the outside diameters of the disc and cover change, the inside diameter thereof fitted onto a rotating shaft often has the same dimension. Therefore, this jig has an advantage that the kinds of jigs prepared to manufacture an impeller (disc, cover) having different outside diameters can be decreased.

Advantageous Effect of Invention

In the present invention, a brazing operation for joining is performed by providing a spacer, which is used to maintain a space between the first joint surface and the second joint surface, on the outer periphery side of the impeller. Therefore, the brazing filler metal can be prevented from flowing excessively out of the joint surface due to the weight of the disc and the cover during the brazing operation, so that after solidification, a brazing layer having an assumed thickness can be obtained.

DESCRIPTION OF EMBODIMENT

The present invention will now be described in detail based on an embodiment shown in the accompanying drawings.

An impeller 10 manufactured by a method in accordance with this embodiment is mounted in a rotating machine such as a centrifugal compressor as a rotating body assembled to a rotating shaft.

Figure 1:
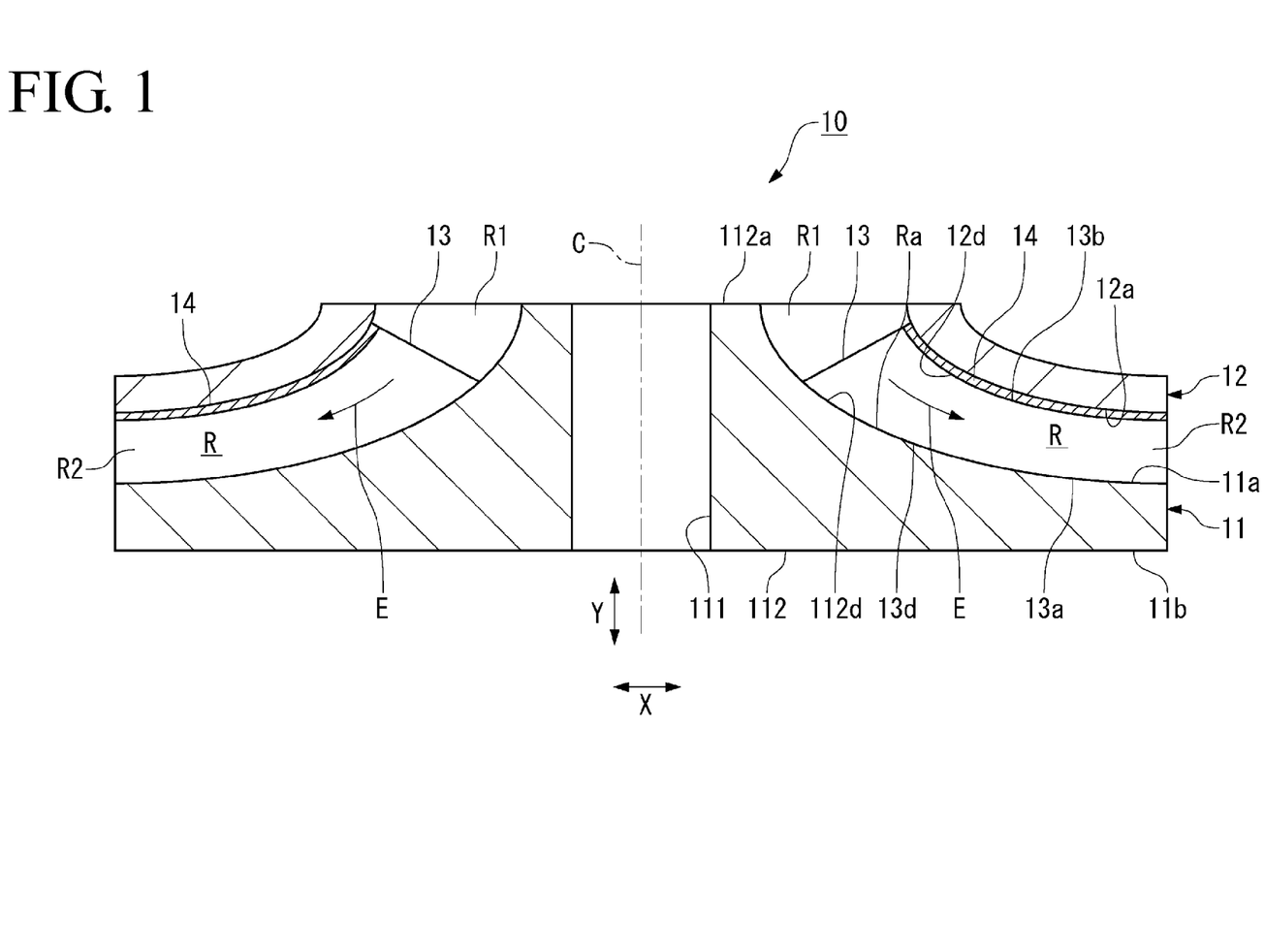
FIG. 1 is a sectional view along a blade of an impeller manufactured by a method in accordance with an embodiment of the present invention.

As shown in FIG. 1, the impeller 10 includes a disc 11, a cover 12, and a plurality of blade-shaped blades 13 as principal constituent elements.

The disc 11 is a substantially disc-shaped member attached coaxially to the rotating shaft, not shown.

The plurality of blades 13 are arranged radially with the rotation axis line C of the rotating shaft being the center so that one end (the lower side in FIG. 1) of each of the blades is in contact with the disc 11. In this embodiment, the blades 13 are formed integrally with the disc 11 by machining a raw material for the disc 11. However, the blades 13 can be formed integrally with the cover 12.

The cover 12 is arranged so as to face to the disc 11. Also, the cover 12 is in contact with the other end (the upper side in FIG. 1) of each of the blades 13. A space formed by the side surfaces of the blade 13 and the opposing surfaces with which the disc 11 and the cover 12 face to each other functions as a passage R for gas compressed by the compressor mounted with this impeller.

In this embodiment, the side close to the rotation axis line C is the inner periphery side of the impeller 10, and the side far from the rotation axis line C is the outer periphery side thereof. Also, in FIG. 1, the compressed gas flows in the passage R in the direction indicated by the arrow mark E. Further, the direction of the rotation axis line C of the impeller 10 is taken as Y-direction, and the radial direction of the impeller 10 as X-direction.

The disc 11 is made of a high-strength and heat-resistant alloy such as a stainless steel, and includes a shaft hole 111 through which the rotating shaft, not shown, is inserted, and a body part 112 extending from the shaft hole 111 toward the outer periphery side. The disc 11 includes a top surface 11a on the upper side (the gas passage R side) facing to the cover 12, and a back surface 11b on the opposite lower side. The top surface 11a has a shape curved so as to project to the tip end 112a side of the body part 112 from the outer periphery side toward the inner periphery side. That is, on the inner periphery side of the top surface 11a of the disc 11, a curved surface 112d having a shape extending along a curved part Ra of the passage R is formed.

Each of the blades 13 provided between the disc 11 and the cover 12 is formed so as to be curved smoothly so as to project to the tip end side in the rotating shaft direction Y and toward the inner periphery side in the radial direction X along the top surface 11a of the disc 11, and be also curved in the circumferential direction of the disc 11. This curved portion (a curved surface 13d) takes a shape extending along the curved part Ra of the passage R.

In the blade 13, an edge portion located on the disc 11 side is taken as a disc-side blade edge part 13a, and an edge portion located on the cover 12 side is taken as a cover-side blade edge part 13b. In this embodiment, in the blade 13, the disc-side blade edge part 13a and the top surface 11a of the disc 11 are formed integrally, and the cover-side blade edge part 13b is joined to a blade mounting surface 12a of the cover 12 via a brazing filler metal 14. In the case where the blade mounting surface 12a of the cover 12 and the cover-side blade edge part 13b are formed integrally, the disc-side blade edge part 13a is joined to the top surface 11a of the disc 11 via the brazing filler metal 14.

The lower surface (the blade mounting surface 12a) of the cover 12 is joined to the cover-side blade edge part 13b of the blade 13 via the brazing filler metal 14, and is curved so as to project to the tip end side in the rotating shaft direction Y from the outer periphery side toward the inner periphery side. That is, on the inner periphery side of the blade mounting surface 12a of the cover 12, a curved surface 12d having a shape extending along the curved part Ra of the passage R is formed.

As described above, between the adjacent blades 13, the passage R is formed to generate compressed air with the rotation of the impeller 10. The passage R has a shape curved in the radial direction X and the rotating shaft direction Y along with the shapes of the disc 11, the blade 13, and the cover 12.

When the impeller 10 for a compressor configured as described above is rotationally driven around the rotation axis line C by a driving part, not shown, an air flow indicated by the arrow mark E, which is directed from the inner periphery side toward the outer periphery side, is generated in the passage R, and the air is accelerated by a centrifugal force created by the rotation. Thereby, the air sucked through an inlet R1 of the passage R is compressed in the passage R and is discharged through an outlet R2. Thereafter, the compressed air is sent to an external equipment, not shown, on the downstream side.

Next, a method for manufacturing the above-described impeller 10 is explained with reference to FIGS. 2 to 5.

Figure 2A:
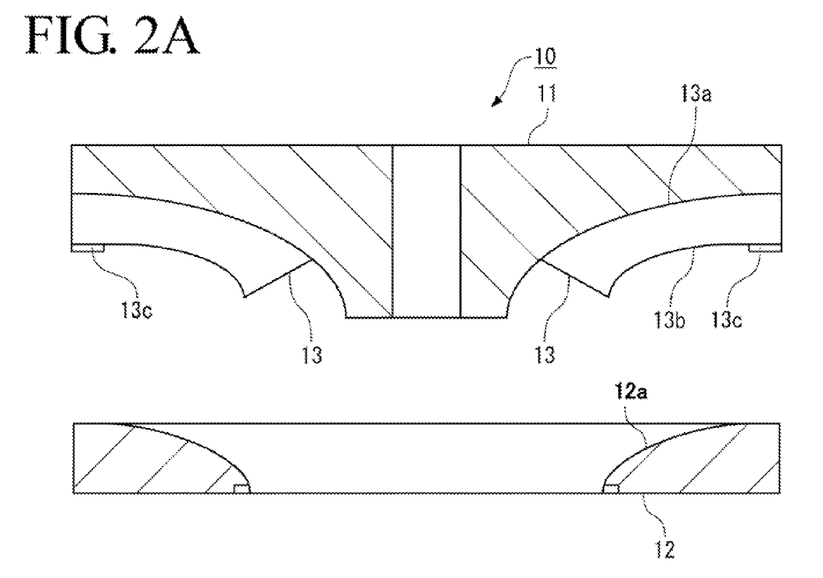
FIGS. 2A and 2B are sectional views showing a brazing method in accordance with an embodiment of the present invention, FIG. 2A showing a state in which a disc and a cover are separated, and FIG. 2B showing a state in which the disc and the cover are lapped on each other.

First, as shown in FIG. 2A, the disc 11 and the plurality of blades 13 are integrally formed by machining a raw material. At the time of integral forming, a spacer 13c is formed in the cover-side blade edge part 13b. The spacer 13c projects from the cover-side blade edge part 13b toward the cover 12. Also, the spacer 13c is provided on the outer periphery side of the blade 13. The projection height of the spacer 13c is determined according to the thickness of the brazing filler metal as described below.

Figure 2B:
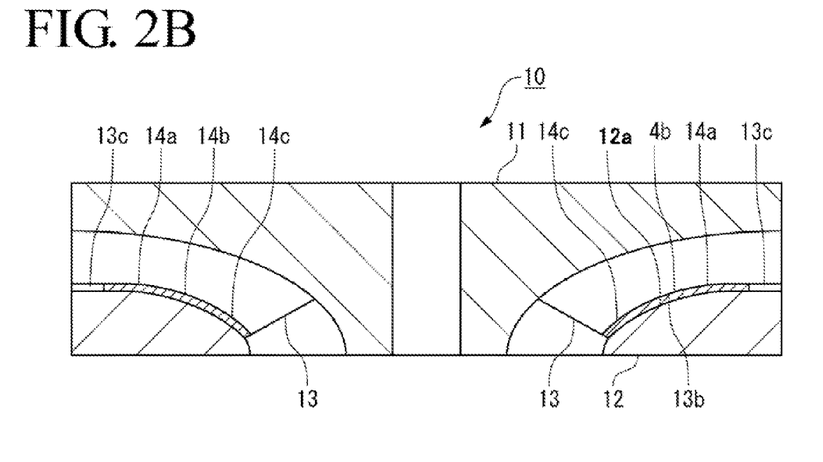

The spacer 13c may be provided on all of the blades 13. However, when the disc 11 is viewed from the top, the spacer 13c may be provided on at least three blades 13 so as to correspond to the vertexes of a triangle, or provided on every other blade 13. This is favorable in terms of the reduction in man-hour for forming the spacers 13c. FIGS. 2A and 2B show the disc 11 and the cover 12 that are turned over from the state shown in FIG. 1. Brazing is performed in the state shown in FIGS. 2A and 2B like Patent Document 1.

Figure 3A:
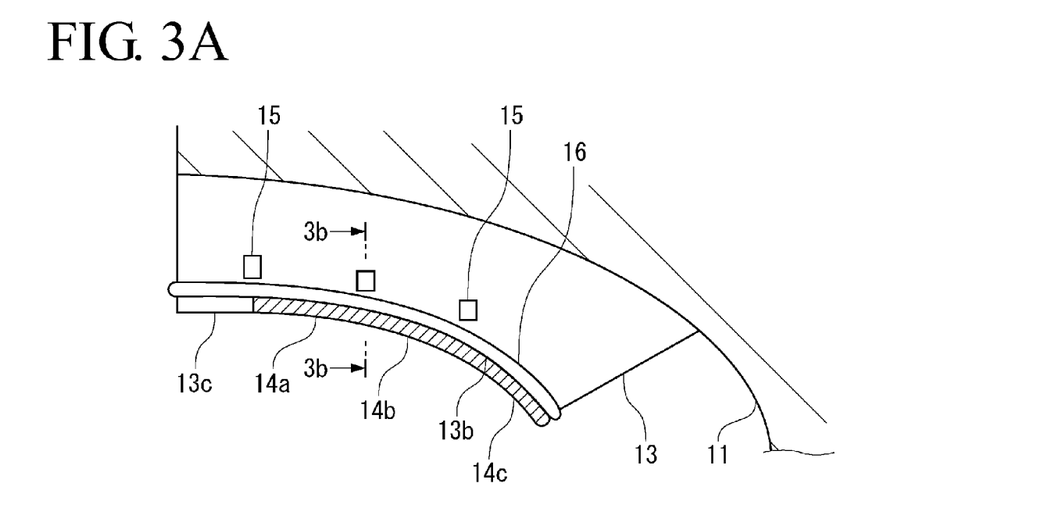
FIGS. 3A and 3B are sectional views showing a situation in which a brazing filler metal is placed onto the tip end surface of blade (a first joint surface), FIG. 3A being a partial sectional view, and FIG. 3B being a sectional view taken along the line 3b-3b of FIG. 3A.
Figure 3B:
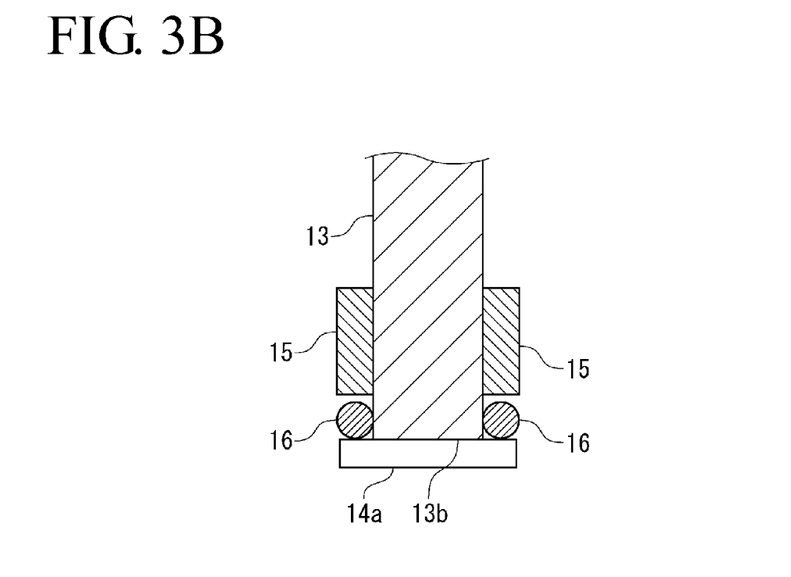

Prior to brazing operation, the brazing filler metal 14 is placed on the cover-side blade edge part 13b. Since the cover-side blade edge part 13b is curved, it is not easy to gaplessly place the sheet-shaped brazing filler metal 14 having a thickness of 100 μm or larger on the cover-side blade edge part 13b. In this embodiment, therefore, as shown in FIGS. 3A and 3B, brazing filler metal segments 14a to 14c formed by dividing the brazing filler metal into plural numbers in the lengthwise direction are used. Even if the cover-side blade edge part 13b is curved, the brazing filler metal segments 14a to 14c divided as described above can be placed gaplessly on the cover-side blade edge part 13b. The thicknesses of the brazing filler metal segments 14a to 14c are preferably a little larger than the projection heights (thicknesses) of the spacers 13c. Thereby, a pressure is applied to the brazing filler metal segments 14a to 14c at the brazing time, so that the brazing filler metal can be spread thoroughly.

In this embodiment, in addition to the brazing filler metal segments 14a to 14c (a first brazing filler metal) placed between the cover-side blade edge part (a first joint surface) 13b and the blade mounting surface (a second joint surface) 12a, auxiliary brazing filler metals (a second brazing filler metal) 15 are placed in locations corresponding to the joint between the adjacent brazing filler metal segment 14a and brazing filler metal segment 14b and the joint between the brazing filler metal segment 14b and the brazing filler metal segment 14c. This is because when the brazing filler metal runs short in the joint portion, the shortage is compensated, and the brazing operation is performed more reliably. Also, in this embodiment, to form a fillet in the joint portion after brazing, brazing is performed by providing a brazing filler metal (a third brazing filler metal) 16. The brazing filler metal 16 is placed on both side surfaces of the blade 13 in the vicinity of the cover-side blade edge part 13b. The brazing filler metal segments 14a to 14c and the brazing filler metals 15 and 16 are fixed to predetermined positions of the blade 13 by a means such as spot welding. The fillet means a brazing portion protruding from the brazing joint surface.

As shown in FIG. 2B, the disc 11 on which the brazing filler metal segment 14a and the like are placed is lapped on the cover 12 produced separately. The disc 11 is placed so that the cover-side blade edge part (the first joint surface) 13b is directed downward, and the cover 12 is placed so that the blade mounting surface (the second joint surface) 12a is directed upward. The disc 11 and the cover 12 thus lapped on each other are transferred into a heating furnace, and thereafter brazing operation is performed in which heating is performed at a temperature corresponding to the melting temperature of the brazing filler metals for a necessary time period, and further cooling is performed, whereby the disc 11 and the cover 12 are joined to each other.

Figure 4A:
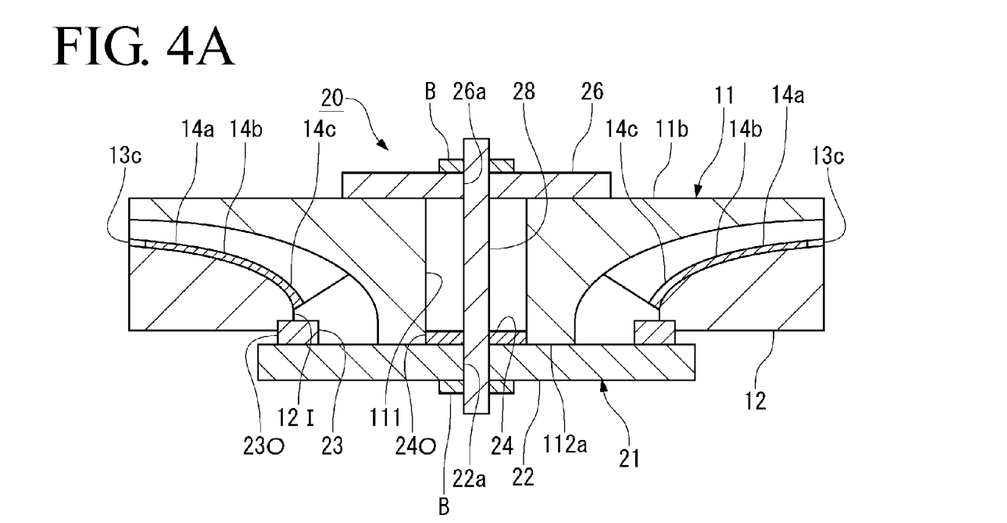
FIG. 4A is a sectional view showing a state in which a cover is fixed to a disc by using a jig in accordance with an embodiment of the present invention.
Figure 4B:
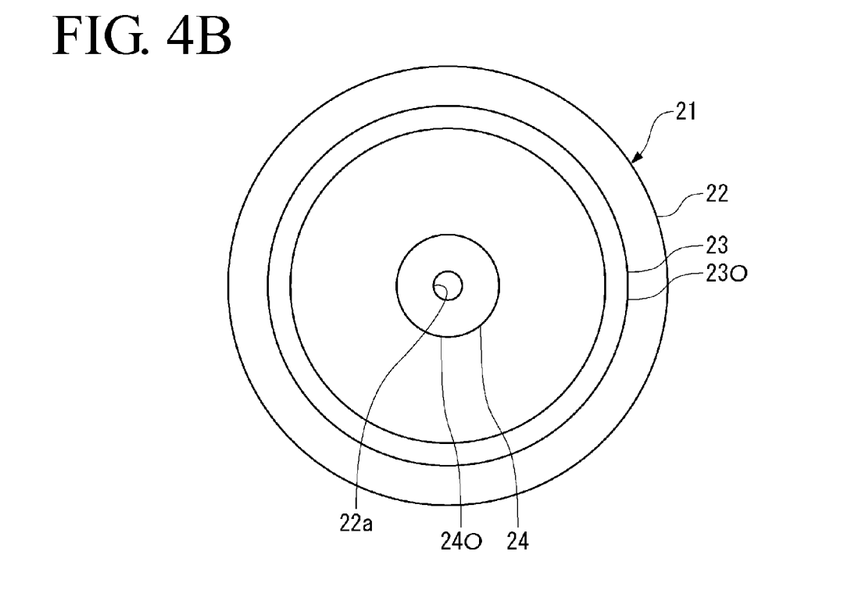
FIG. 4B is a plan view of a first fixing member.

When brazing is performed, the brazing filler metal segments 14a to 14c are preferably brought into close contact with the joint surfaces (the cover-side blade edge part 13b and the blade mounting surface 12a), and a fixing jig 20 shown in FIGS. 4A and 4B is preferably used to prevent a relative positional shift between the disc 11 and the cover 12.

The fixing jig 20 includes a first fixing member 21 for positioning the disc 11 and the cover 12, a second fixing member 26 arranged on the back surface 11b side of the disc 11 so as to face to the first fixing member 21, and a fastening shaft 28 for fastening the first fixing member 21 and the second fixing member 26 to each other.

The first fixing member 21 includes a disc-shaped body 22, a first restraint part 23, and a second restraint part 24.

In the central portion of the body 22, a hole 22a through which the fastening shaft 28 passes is formed. The first restraint part 23 is a ring-shaped protrusion extending in the circumferential direction of the body 22, and is provided on one surface side of the body 22. The second restraint part 24 is provided on the inside of the first restraint part 23. The second restraint part 24 is a hollow cylindrical shaped protrusion in which a portion in which the hole 22a of the body 22 extends is a space. The first restraint part 23 and the second restraint part 24 are arranged coaxially.

The second fixing member 26 is a disc-shaped member, and is formed with a hole 26a through which the fastening shaft 28 passes.

The first fixing member 21 is arranged so as to be in contact with the surface of the tip end 112a of the disc 11. In this state, the first restraint part 23 is fitted onto the inner periphery of the cover 12. Therefore, the diameter of an outer peripheral face 23O of the first restraint part 23 is set considering the diameter of an inner peripheral surface 12I of the cover 12. Also, for the first fixing member 21, the second restraint part 24 is fitted into the shaft hole 111 of the disc 11. Therefore, the diameter of an outer peripheral face 24O of the second restraint part 24 is set considering the diameter of the shaft hole 111.

On the other hand, the second fixing member 26 is arranged so as to be in contact with the surface of the back surface 11b of the disc 11. The fastening shaft 28 is arranged so as to pass through the hole 22a in the first fixing member 21 and the hole 26a in the second fixing member 26. For the fastening shaft 28, a portion projecting from the first fixing member 21 and a portion projecting from the second fixing member 26 are threaded (illustration is omitted), and bolts B are screwed in the threaded portions. By adjusting the threading amount, the disc 11 and the cover 12, which are held between the first fixing member 21 and the second fixing member 26, are pushed against each other with a necessary force. At this time, the first restraint part 23 provided on the body 22 is fitted onto the inner periphery of the cover 12, and the second restraint part 24 provided on the body 22 is fitted into the shaft hole 111 of the disc 11, whereby the positioning in the radial direction of the disc 11 and the cover 12 is performed.

After the brazing operation has been ended, and the joining of the disc 11 and the cover 12 has been completed, the fixing jig 20 is removed, and a finish machining operation is performed.

Figure 5A:
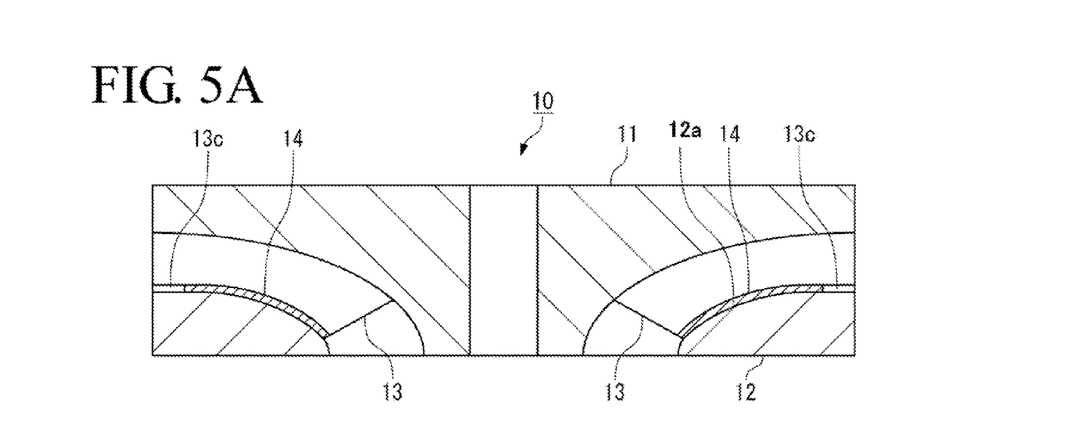
FIGS. 5A and 5B are sectional views of an impeller in accordance with an embodiment of the present invention, FIG. 5A showing a state before an outer peripheral part is removed by cutting, and FIG. 5B showing a state after the outer peripheral part has been removed by cutting.
Figure 5B:
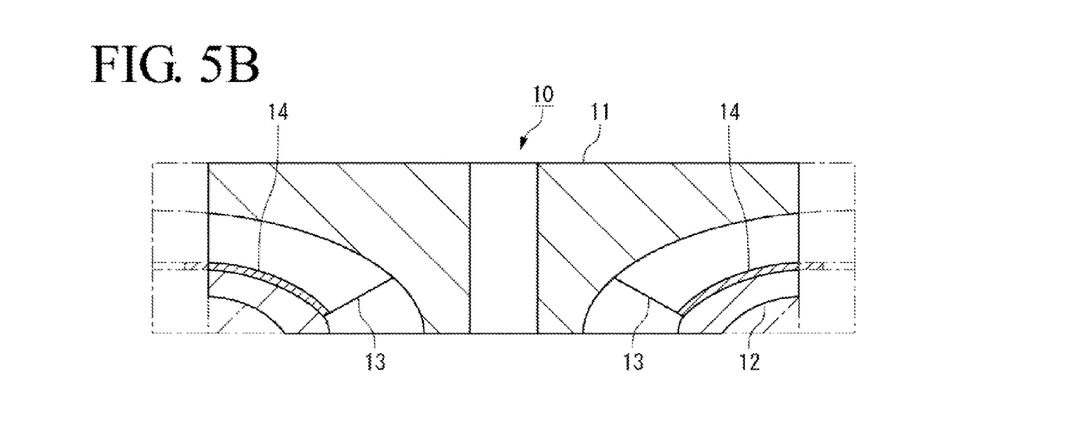

As one finish machining operation, a work is cited in which the impeller 10 having been brazed as shown in FIG. 5A is machined so as to turn the flat outer surface of the cover 12 into a curved surface as shown in FIG. 5B. Also, as another finish machining operation, a work is cited in which a portion in a predetermined range is removed from the outer periphery of the impeller 10 (disc 11, cover 12) as shown in FIG. 5B. This machining operation is performed to remove the distorted portion of the impeller 10 to secure the dimensional accuracy thereof, as described above. By this operation, the spacer 13c is preferably removed. Since no brazing filler metal is interposed between the spacer 13c and the blade mounting surface 12a of the cover 12, the joining in this portion is insufficient. Also, the spacer 13c itself is not a necessary component of the impeller 10. Therefore, from the viewpoint of ensuring the strength of the impeller 10, it is preferable that after the brazing operation has been ended, the spacer 13c be removed along with the finish machining operation for cutting out the outer periphery of the impeller 10.

EXPERIMENT EXAMPLE

Hereunder, an example of experiment conducted to confirm the effect of the present invention is explained.

Two steel pieces consisting of SUS630 were butted against each other and brazed with a gold brazing filler metal to produce a test specimen for Charpy impact test (in conformity to JIS Z2242). The chemical composition of the used steel pieces and the composition of the brazing filler metal are described below. As the brazing filler metal, a sheet-shaped metal having the thickness described below was used, and a spacer is provided between the two steel pieces to maintain the initial thickness, thus performing heat treatment of brazing. However, for the brazing filler metal having a thickness of 100 μm, brazing operation was performed without providing the spacer.

Chemical composition of steel pieces (in conformity to JIS SUS630):
　Cr: 15.5%, Ni: 4.3%, Cu: 3.5%, Nb+Ta: 0.35%
　C: 0.05%, Si: 0.25%, Mn: 0.8%, P: 0.0035%, S: 0.007%
　Balance: Fe and unavoidable impurities
Composition of brazing filler metal: 18% Ni-82% Au
Thickness of brazing filler metal: 100 μm, 200 μm, 300 μm A joint portion of a specimen obtained by brazing performed under the above-described conditions is subjected to a Charpy impact test, and absorbed energy was determined. The result is shown in FIG. 6.

Figure 6:
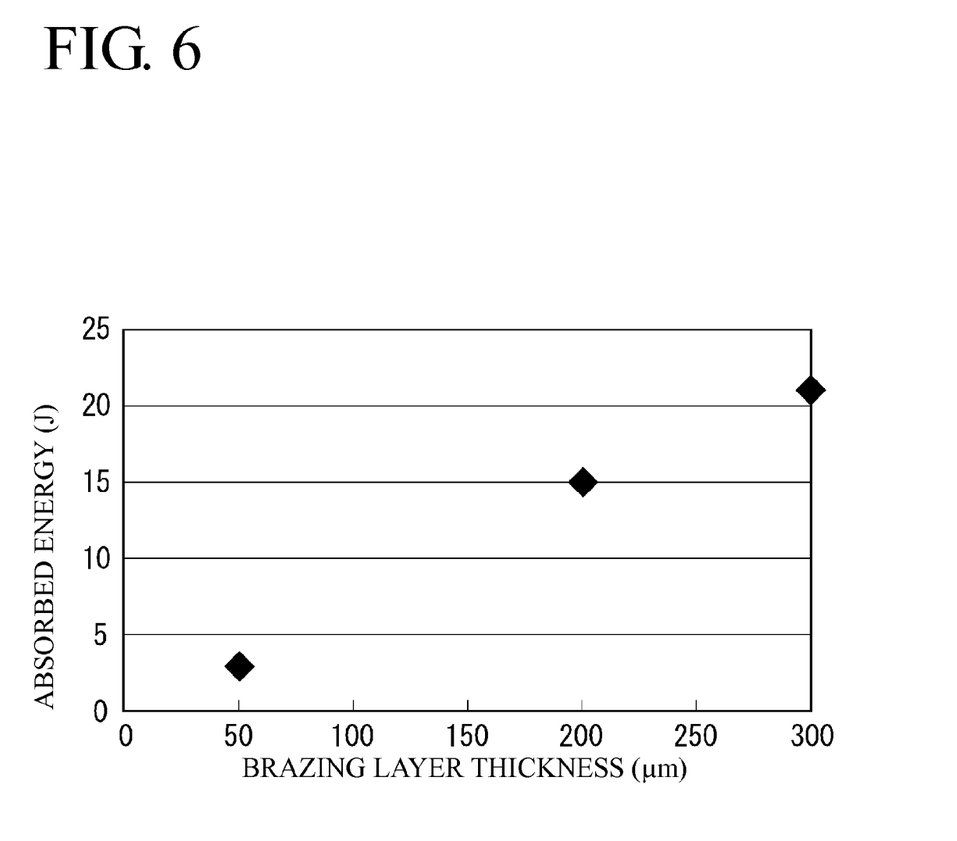
FIG. 6 is a graph showing the relationship between the thickness of a brazing layer after brazing and the absorbed energy of a joint portion.

In FIG. 6, the abscissas represent the brazing layer thickness and the ordinates the absorbed energy. The example in which the brazing layer thickness is 50 μm indicates the case where the thickness of the brazing filler metal is 100 μm. In this case, since the brazing filler metal flowed out of the joint surface in the process of brazing, the brazing layer thickness decreased to a half of the thickness of brazing filler metal.

The relationship between the brazing layer thickness and the Charpy absorbed energy reveals that when the thickness is 50 μm, only Charpy absorbed energy of 5 J or less is obtained, whereas when the thickness is 200 μm, Charpy absorbed energy of about 15 J is obtained, and when the thickness is 300 μm, Charpy absorbed energy of 20 J or more is obtained.

As described above, in this embodiment, by providing the spacer 13c, the space between the cover-side blade edge part 13b (the first joint surface) and the blade mounting surface 12a (the second joint surface) can be maintained during the brazing operation. Therefore, the brazing filler metal can be prevented from excessively flowing out from between the cover-side blade edge part 13b and the blade mounting surface 12a, so that a necessary thickness of brazing layer can be ensured while the waste of the brazing filler metal is eliminated.

Especially in this embodiment, since the spacer 13c is provided on the outer peripheral side that is to be removed after brazing, a process for removing the spacer 13c need not be added newly.

The above is an explanation of an embodiment of a method for manufacturing an impeller. The present invention is not limited to the above-described embodiment, and changes can be made as appropriate.

In particular, concerning the spacer 13c, an example in which the spacer 13c is provided integrally with the blade 13 formed integrally with the disc 11 has been explained. However, the present invention is not limited to this configuration. The spacer can be produced separately from the constituent elements of the impeller 10 such as the disc 11 and the cover 12. Also, in the case where the blade 13 is formed integrally with the disc 11, the spacer can be provided integrally on the cover 12 side. Further, in the case where the blade 13 is formed integrally with the cover 12, the spacer can be formed integrally with the blade 13, or can be formed integrally on the disc 11 side.

Also, the shape, size, or the like of the disc 11, the cover 12, and the blade 13 shown in this embodiment is one example, and other shapes and the like can be employed.

REFERENCE SIGNS LIST

10 ... impeller
11 ... disc
12 ... cover, 12a ... blade mounting surface (second joint surface)
13 ... blade, 13a ... disc-side blade edge part (first joint surface), 13c ... spacer
14, 15, 16 ... brazing filler metal, 14a, 14b, 14c ... brazing filler metal segment
20 ... fixing jig, 21 ... first fixing member, 23 ... first restraint part, 24 ... second restraint part
R ... passage

The invention claimed is:

1. A method for manufacturing an impeller which has a disc, a cover arranged facing the disc, and a plurality of blades provided between the disc and the cover, wherein a passage is formed between the disc and the cover, the method comprising:

providing a disc and a cover separate from the disc, one of the cover and the disc having integrally formed blades and the other one of cover and the disc having a first joint surface;

joining the disc and the cover to each other by brazing in a state in which a first brazing filler metal is interposed between the first joint surface and a second joint surface provided on the blades; and during said joining operation, maintaining a space between the first joint surface and the second joint surface by providing a spacer on an outer periphery side of the impeller, wherein the thickness of the spacer is smaller than the thickness of the first brazing filler metal before melting, and wherein the spacer is formed integrally with the blade or is formed integrally with said other one of the cover and the disc.

2. The method of claim 1, further comprising, after said brazing operation is completed, removing a portion in a predetermined range on the outer periphery side of the impeller.

3. The method of claim 1, further comprising, after said brazing operation is completed, removing the spacer by removing a portion on the outer periphery side of the impeller.

4. The method of claim 1, wherein the first brazing filler metal is formed of brazing filler metal segments which are segmented in the lengthwise direction, and the brazing filler metal segments are interposed between the first joint surface and the second joint surface.

5. The method of claim 4, wherein in said joining operation, a second brazing filler metal is disposed in a location corresponding to a joint between adjacent brazing filler metal segments.

6. The method of claim 1, wherein said brazing operation is performed in a state in which a pressure is applied in the axial direction to the disc and the cover using a jig, and wherein the jig includes a first restraint part which is in contact with the inside diameter of the cover to restrain the radial movement of the cover, and a second restraint part which is in contact with the inside diameter of the disc to restrain the radial movement of the disc, and wherein the first restraint part is coaxial with the second restraint part.

7. The method of claim 1, further comprising placing the disc and the cover in a jig and applying pressure in the axial direction, wherein the jig includes a first restraint part which is in contact with the inside diameter of the cover to restrain the radial movement of the cover, and a second restraint part which is in contact with the inside diameter of the disc to restrain the radial movement of the disc.

8. The method of claim 7, wherein the first restraint part is coaxial with the second restraint part.

9. The method of claim 7, further comprising, after said brazing operation is completed, removing the spacer by removing a portion on the outer periphery side of the impeller, wherein the first brazing filler metal is formed of brazing filler metal segments which are segmented in the lengthwise direction, and the brazing filler metal segments are interposed between the first joint surface and the second joint surface, and wherein in said joining operation, a second brazing filler metal is disposed in a location corresponding to a joint between adjacent brazing filler metal segments.

10. The method of claim 1, further comprising, after said brazing operation is completed, removing the spacer by removing a portion on the outer periphery side of the impeller, wherein the first brazing filler metal is formed of brazing filler metal segments which are segmented in the lengthwise direction, and the brazing filler metal segments are interposed between the first joint surface and the second joint surface, and wherein in said joining operation, a second brazing filler metal is disposed in a location corresponding to a joint between adjacent brazing filler metal segments.

* * * * *